Sept. 19, 1944.                W. ANGST                 2,358,613
                            PRESSURE GAUGE
                         Filed Feb. 3, 1943            4 Sheets-Sheet 1

INVENTOR.
Walter Angst
BY
Furman Reinhart
ATTORNEY

Sept. 19, 1944.  W. ANGST  2,358,613
PRESSURE GAUGE
Filed Feb. 3, 1943  4 Sheets-Sheet 2

INVENTOR.
Walter Angst
BY
Furman Rinehart
ATTORNEY

Sept. 19, 1944.   W. ANGST   2,358,613
PRESSURE GAUGE
Filed Feb. 3, 1943   4 Sheets-Sheet 3
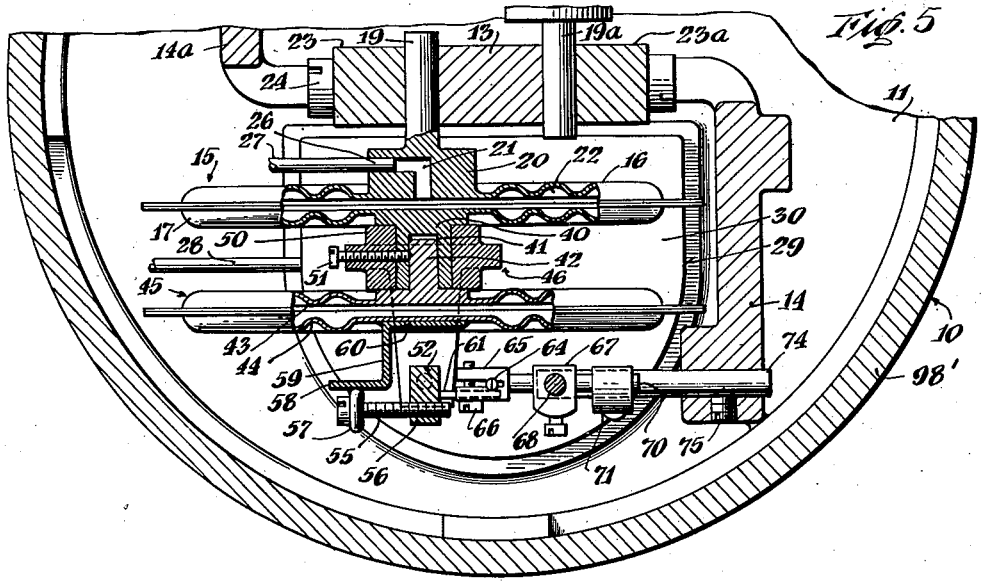
Fig. 5
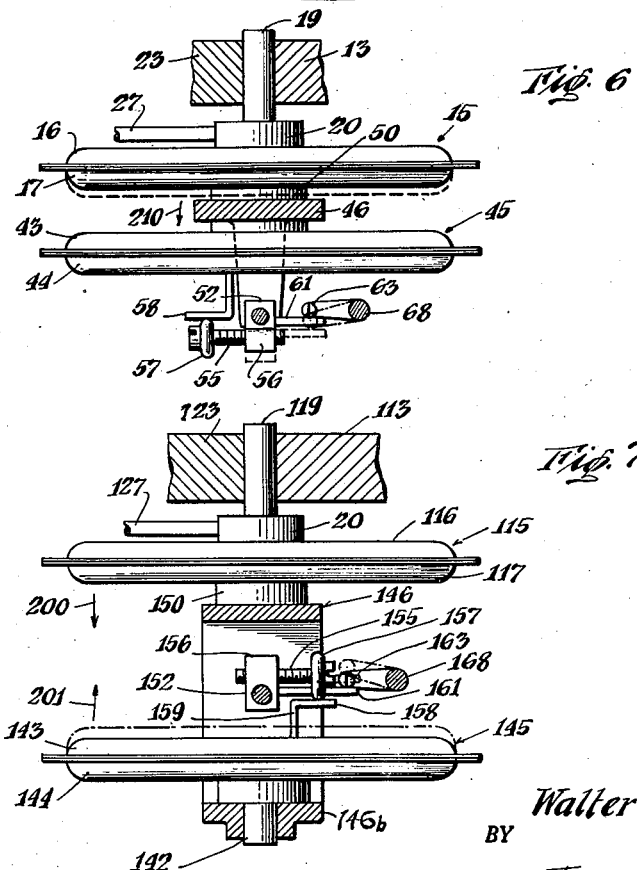
Fig. 6
Fig. 7
INVENTOR.
Walter Angst
BY
Furman Rinehart
ATTORNEY Sept. 19, 1944.  W. ANGST  2,358,613
PRESSURE GAUGE
Filed Feb. 3, 1943  4 Sheets-Sheet 4

INVENTOR.
Walter Angst
BY
Finman Rinehart
ATTORNEY

Patented Sept. 19, 1944

2,358,613

UNITED STATES PATENT OFFICE 2,358,613

PRESSURE GAUGE

Walter Angst, Manhasset, N. Y., assignor to Square D Company, Detroit, Mich., a corporation of Michigan Application February 3, 1943, Serial No. 474,526

16 Claims. (Cl. 73—407)

This invention relates to pressure responsive devices and more particularly to pressure gauges.

Pressure responsive indicating instruments when used on aircraft are subjected to various conditions by reason of the nature of flight. It is of the utmost importance that such instruments indicate accurately at all times the conditions being measured regardless of changes in altitude, temperature, or barometric pressure.

This invention provides a pressure gauge particularly adapted for measuring absolute manifold pressure of motors mounted in aircraft and is admirably suited to the accomplishment of the above mentioned desirable objective as well as others mentioned hereinafter.

According to the invention, the indicating pressure gauge comprises indicating means and two diaphragm capsules, at least one of which is adapted to be connected to the source of pressure to be measured. Both capsules may expand or contract upon changes of ambient atmospheric pressure and are so mounted and arranged that errors of indication of the pressure to be measured which might otherwise be caused when the gauge is subjected to different ambient pressures are compensated for or effectively cancelled out whereby the gauge will indicate the actual pressure of the source.

According to a preferred embodiment of the invention, there is provided an instrument for indicating pressure and more particularly a manifold pressure gauge arranged so that a conduit from the engine manifold communicates with the interior of a diaphragm capsule which expands and contracts in response to pressure changes. Thus undesirable vapors and condensate from the manifold do not come in contact with the other working parts of the instrument. This diaphragm capsule, herein referred to for convenience of description as the "manifold pressure capsule," is mounted in such manner that it is not restrained but is free to expand and contract in response to changes either in the manifold pressure or the ambient atmospheric pressure or both. Mechanism is provided to translate the movement of the manifold pressure diaphragm capsule to a hand which travels over a graduated dial to indicate the manifold pressure. A second hermetically sealed diaphragm capsule is mounted to move bodily in response to contraction or expansion of the manifold pressure diaphragm capsule and so arranged that it may contract or expand without restraint in response to increased or decreased ambient atmospheric pressure. The two diaphragm capsules are arranged and connected with mechanism to translate the movement of the capsules in such manner that only expansion of the manifold diaphragm capsule resulting from change of manifold pressure is indicated by the instrument. That is to say, provision is made, according to the invention, whereby errors of indication which otherwise would occur due to changes in barometric or ambient pressure or temperature may be substantially or entirely eliminated.

In other words, the manifold pressure diaphragm capsule expands or contracts in response to both manifold pressure and ambient atmospheric pressure, but inasmuch as it is desirable to compensate for the expansion and contraction of that capsule, which is due to change in atmospheric pressure, such expansion or contraction may be balanced out by the expansion or contraction of a second and hermetically sealed capsule which expands and contracts in response to the same change in atmospheric pressure. Consequently, the gauge will indicate manifold pressure only to an extent which is commensurate with the movement of the manifold pressure capsule due to manifold pressure being measured.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 is a plan view looking toward the face of the instrument;

Fig. 5 is a section on line 5—5 of Fig. 4 in larger dimensions;

Fig. 6 is a view partially diagrammatic to illustrate certain principles of the invention;

Fig. 7 is a view partially diagrammatic to illustrate a modification;

Like reference characters denote like parts in the several figures of the drawings.

Figure 1:
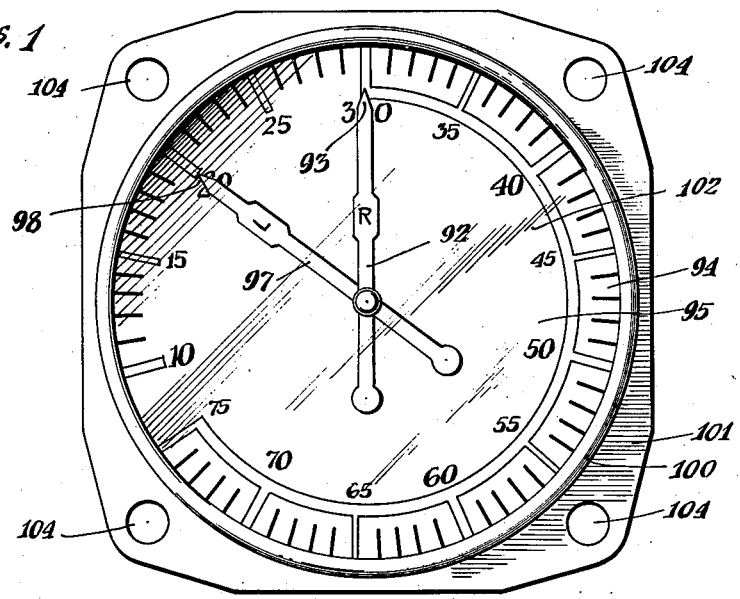
Figure 2:
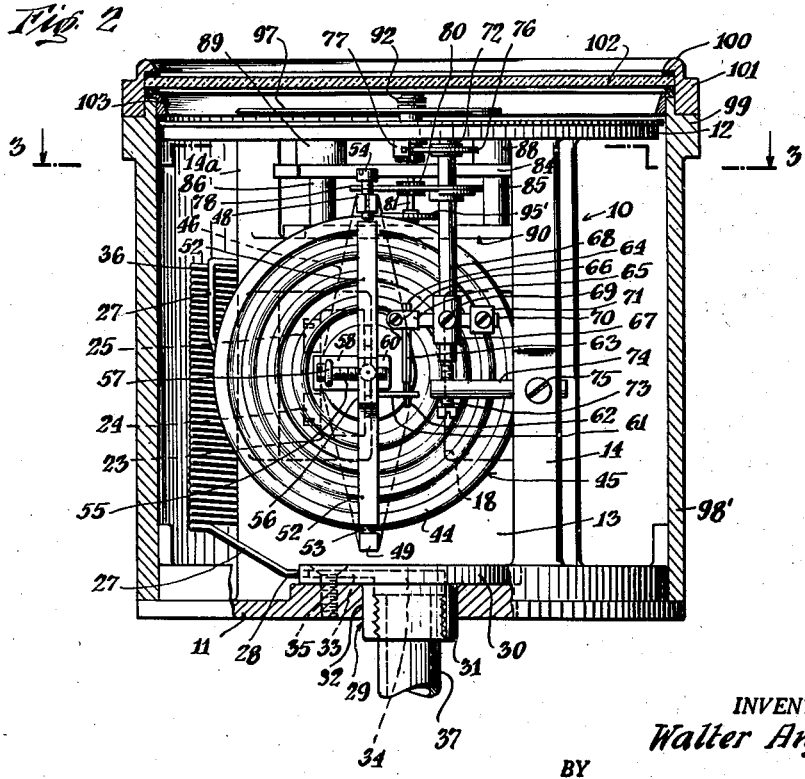
Fig. 2 is a view of the instrument in elevation and partly in section.
Figure 3:
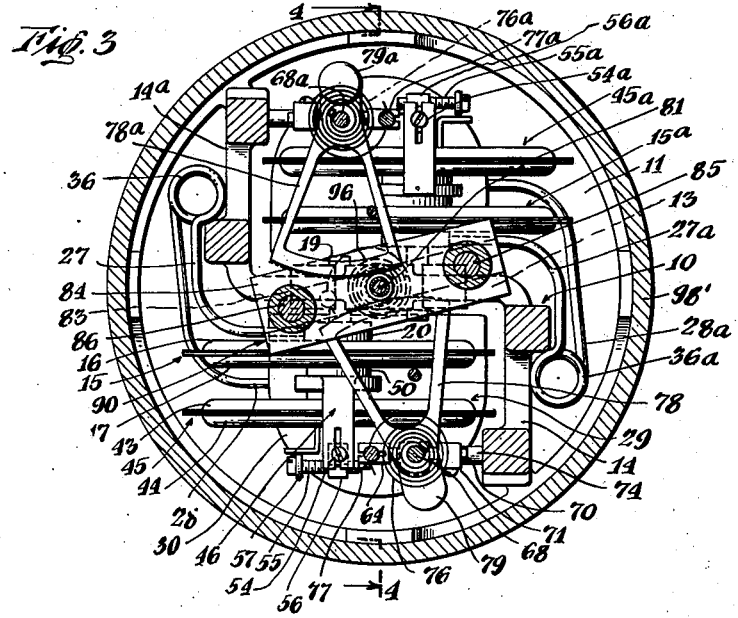
Fig. 3 is a section on line 3—3 of Fig. 2.
Figure 4:
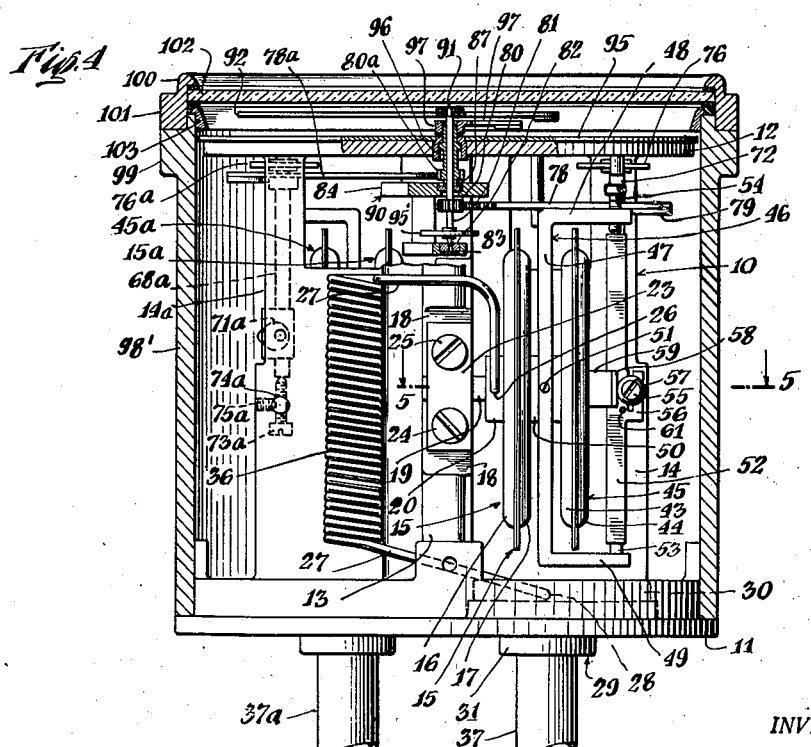
Fig. 4 is a section on line 4—4 of Fig. 3.

Referring now to the drawings, and more particularly to Figs. 1 to 5, which show for purposes of illustration a preferred embodiment of the invention, there is provided a main frame assembly, designated generally by reference character 10. The main frame assembly comprises a back or base plate 11 and a front or face plate 12 between which is mounted a center frame member or standard 13 for supporting certain of the parts hereinafter described. In addition to the center standard 13 there is provided complementary standards 14 and 14a for mounting other parts of the device. It has been found expedient to cast the base plate 11 and frame members 13, 14 and 14a integrally to which casting, the face plate 12 may be securely fixed, as by screws through the face plate extending into the adjacent engaging frame members, thus to provide the main frame assembly 10.

Inasmuch as the instrument being described embodies two complementary pressure measuring units, each operative independently of the other, it will suffice to describe only one in detail. It will be understood that reference characters with the sub-titles "a" refer to corresponding parts of the other unit wherein reference characters without sub-titles are used.

A diaphragm capsule 15 comprising a pair of corrugated flexible metal diaphragms 16 and 17 securely joined to each other at their peripheries is fixedly, but removably and adjustably, mounted on a cut away portion 18 of the center frame standard 13. The diaphragm 16 (see Figs. 4 and 5) has fixed thereto in its center a suporting stud 19. It will be observed that supporting stud 19 has an enlarged end or annular shoulder 20 engaging the diaphragm 16. This annular shoulder is provided with a conduit 21 leading to the interior or chamber 22 defined by the inner surfaces of the diaphragms 16 and 17. To securely fasten the stud 19 to the frame 10, there is provided a clamping block 23 which engages the stud and standard 13. The clamping block 23 may be caused to securely clamp the stud 19 by means of screws 24 and 25.

One end 26 of a tube 27 is joined to the annular shoulder 20 and the other end 28 is joined to a connecting member 29. This connecting member comprises a plate 30 having extending therefrom a hollow threaded boss 31 extending through a suitable aperture 32 in the base plate 11. It will be observed that plate 30 is provided with a conduit 33 communicating with the end 28 of the tube 27 and the space 34 in the hollow threaded boss 31. The other end 26 of the tube 27 communicates with conduit 21. The plate 30 may be securely fastened to the base plate in any desired manner, such as by screws 35. It has been found expedient to make the tube 27 of relatively small diameter and of extended length and to form it in helical shape as shown at 36 to provide a damping effect in the event the pressure to be measured is pulsating or changes rapidly. A conduit 37 leading from the manifold, the pressure of which is to be measured, may be screwed into or otherwise connected to the hollow boss 31. Accordingly, there is provided a conduit from the manifold, or source of pressure, communicating with the interior of the diaphragm capsule 15 and this much of the unit is hermetically sealed except for the passage from the manifold to the interior of this capsule, which diaphragm capsule, as stated, is herein referred to for convenience of description, as a "manifold pressure diaphragm capsule."

A hollow stud member 40 (see Fig. 5) is fixedly mounted on diaphragm 17 of the capsule 15 at its center. The hollow portion 41 of the stud 40 accommodates a stud 42 in male and female fashion. The stud 42 in turn is secured to the center of a corrugated diaphragm 43 which diaphragm 43 together with diaphragm 44 forms a second diaphragm capsule 45. This second capsule is referred to herein for convenience of description, as a "compensating diaphragm capsule." The interior of this capsule 45 is preferably, but not necessarily, under relatively high or partial vacuum. This capsule is hermetically sealed. It will be understood when the compensating capsule is evacuated and hermetically sealed the instrument is better adapted to indicate absolute pressure.

A U-shaped bracket 46 comprising cross member 47 and arms 48 and 49 extending outwardly therefrom, is mounted on the stud 40. The cross member 47 of the bracket 46 is provided with a ring 50 having an aperture therein to accommodate the stud 40. A set screw 51 passing through a threaded aperture in the ring 50 and through a threaded aperture in the hollow stud 40 provides means for securely attaching the bracket 46 and the second or compensating capsule 45 to the diaphragm 17 of the first or manifold pressure capsule 15.

A rocker shaft 52 is mounted at one end 53 in a bearing in one end of bracket arm 49 and at its other end it engages a threaded pivot screw 54, extending through bracket arm 48, this threaded screw providing adjustable bearing play. Accordingly, the rocker shaft may rotate about its longitudinal axis. A lever screw 55 is threaded into a block 56 on the rocker shaft 52. This screw is provided with an annular shoulder 57 which engages and rests against a table 58 which in turn is fixed to the center of diaphragm 44 in a suitable manner such as by a leg 59 and abutting portion 60 (see Fig. 5).

From the foregoing description it will be apparent that an expansion of diaphragm capsule 15 (see Fig. 5), due to an increase of pressure within this capsule, will cause a bodily movement of the bracket 46 and of capsule 45 away from the center frame member 13 a distance equal to the expansion of capsule 15 which will be in the same direction since the capsules are free only to expand in that direction. If the expansion of capsule 15 is due entirely to an increase of pressure within this capsule, there will be a bodily movement of the bracket 46. However, if there is no change in the ambient atmospheric pressure or temperature there is no rotation of rocker shaft 52 about its axis because this rocker shaft is mounted on bracket 46. If, on the other hand, there is a change in ambient atmospheric pressure there will be a resulting expansion or contraction of diaphragms 15 and 45 with consequent rotation of the rocker shaft 52 as described in further detail hereinafter.

Also mounted on rocker shaft 52 is a lever arm 61 (see Fig. 2) extending in a direction substantially parallel with the lever screw 55. Lever arm 61 engages and rests against the free end 62 of bimetallic arm 63 which is adjustably mounted at its end 64 to a clamping lever 65, and held secure by means of a screw 66. Clamping lever 65 passes through a hole in portion 67 of rocker shaft 68 and extends from portion 67 of rocker shaft 68. The clamping lever 65 may be adjustably but fixedly secured to the rocker shaft by means of set screw 69. This extending portion of lever 65 forms an arm 70 carrying a counterbalance weight 71 which may be adjustably but fixedly secured to this arm. The provision of a bimetallic arm such as arm 63, is a known expedient to those skilled in the art for temperature compensation and further elaboration in that regard is deemed unnecessary.

One end 72 of rocker shaft 68 is mounted in a bearing in the face plate 12 and the other end is mounted on pivot screw 73 which is threaded through the free end of supporting post 74, the other end of which is adjustably but fixedly secured to frame member 14, as by means of a screw 75. Rocker shaft 68 is provided with a spiral spring 76, the inner end of which is secured to the rocker shaft, the outer end being staked to a post 77 fixed to the inner side of the front frame plate 12. The spring 76 is mounted so as to urge the bimetallic arm against the lever arm 61.

Fixedly mounted on rocker shaft 68 is a segment gear 78 having a counterbalance 79. The gear teeth of the segment engages a pinion 80 (see Figs. 2 and 4) fixedly mounted on a hand shaft 81 which is journaled at its inner end in a bearing 82 mounted in a cross piece 83 which is held in spaced parallel relation with another cross piece 84 by means of spacing members 85 and 86. The hand shaft 81 is also journaled in a bearing 87 mounted in cross piece 84 which in turn is mounted in parallel spaced relation with the front plate 12 by means of spacer members 88 and 89. Thus sub-frame (see Figs. 2 and 4) comprising cross pieces 83 and 84 and spacers 85, 86, 88, 89, and designated generally by reference character 90, is secured to the front plate. Hand shaft 81 extends through an aperture in the front frame plate 12 and on its free end 91 has a hand 92 mounted thereon, which hand has a pointer 93 adapted to move over the scale 94 on the dial plate 95 in response to rotation of the hand shaft 81. The hand shaft 81 is also provided with a spiral spring 95' fixed at its inner end to the shaft and staked at its outer end to a post fixed to the cross piece 83.

As mentioned hereinbefore, the embodiment shown in Figs. 1 to 5 is a dual unit instrument. That is to say, in addition to the unit already described a second unit is provided to indicate the pressure of another manifold independently of the first. In all substantial respects, the two units are alike. For convenience and for the sake of brevity, the corresponding parts of the second unit have been designated in the figures of the drawings with like reference characters with the sub-title "a" added. For example, rocker shaft 52 of the first unit corresponds to rocker shaft 52a of the other unit.

In order to utilize only a single dial plate and scale, a segment gear 78a engages a pinion 80a which is fixedly secured to a hollow hand shaft 96. The hollow hand shaft 96 is journaled at its inner free end in cross piece 84 of the sub-frame 90 and is also journaled for rotation in a bearing in the front plate 12. The other free end of the hollow hand shaft 96 extends through the front plate 12 and dial plate 95 and has mounted thereon a hand 97 having a pointer 98 adapted to move over the scale 94 in response to rotation of the hollow hand shaft 96. Hence, hand 92 indicates on the scale 94 the pressure for one unit, and hand 97 indicates on the same scale the pressure for the other unit. It will be understood, of course, that the scale may be graduated in any desirable units of pressure measurement.

The main frame, comprising front and back plates together with the various parts mounted thereon, as hereinbefore described, may be inserted into and secured in a suitable housing. And likewise it may readily removed from the housing for any desired adjustments, calibration or repairs. For aircraft use and convenience of mounting on the instrument panel, it is expedient to provide a housing which comprises a cylindrical side wall 98' having an annular flange 99. A cover glass may be mounted in a bezel ring 100 which is also provided with a flange 101 corresponding to flange 99 of the cylindrical portion of the housing. The glass 102 may be held in place by means of a snap ring 103. Flange 99 may be secured to flange 101 in a well known manner. The assembled instrument may be mounted in a suitable aperture in the panel board by means of screws extending through apertures 104. It may be noted also that the housing need not be airtight or sealed, although in certain instances it may be desirable to do so, in which case the interior of the housing may be provided with a connection for static pressure.

In order better to explain the principle of one feature of the invention, the partially diagrammatic views of Figs. 6 and 7 may conveniently be referred to. Fig. 6 may be said to represent the embodiment shown in Figs. 1 to 5. Fig. 7 may be said to represent a modification.

Referring first to Fig. 7, 113 represents the fixed standard 13 of the main frame, 119 the supporting stud which is fixedly mounted to diaphragm 116 of the capsule 115. It will be noted the last two digits of these reference characters correspond to the reference characters denoting corresponding parts in Figs. 1 to 5. Tube 127 connects with a conduit extending into the interior of capsule 115. Bracket 146 is mounted on diaphragm 117 to move therewith. This bracket instead of being U-shape is rectangular in shape so as to provide a supporting member 146b to support stud 142 which mounts the diaphragm capsule 145. Diaphragm 143 is provided with a table 158. In other words capsule 145 corresponds to capsule 45 in Figs. 1 to 5 but is reversed so that upon expansion of this diaphragm capsule, table 158 will move toward instead of away from the fixed frame 113. Rocker shaft 152 is mounted in the bracket 146 between capsules 115 and 145 instead of beyond capsule 145, as is the case in the embodiment of Figs. 1 to 5 and as shown in Fig. 6.

Now let it be assumed that the instrument is connected to a manifold, or other source of pressure, through conduit 127, and that the atmospheric pressure remains constant and the manifold pressure is represented by P. Capsule 115 will expand an amount corresponding to pressure P and will move the bracket a certain distance in direction of arrow 200, rocker arm 168 will be rotated a corresponding amount because the lever arm 161 moves with the rocker arm 152 in the same direction corresponding to the displacement of the diaphragm of capsule 115, since the rocker arm 152 is mounted on the bracket 146. Under this set of conditions rocker shaft 152 will not be rotated on its axis. Now suppose the atmospheric conditions change, for example, in an open cockpit airplane when an airplane ascends, and the atmospheric pressure is decreased or the cockpit pressure in a closed cabin is changed by supercharging the cabin. Also assume the pressure P remains constant. If there is a decrease in the pressure of the ambient atmosphere around the capsule, capsule 115 would expand, not because of increase of P, but because of a decrease in atmospheric pressure. Hence, unless some compensation is provided, the reading on the dial of the instrument would not represent true manifold pressure. However, according to the invention, the arrangement of capsule 145 will provide the necessary compensation. When capsule 115 expands due to a decrease in atmospheric pressure, capsule 145 will expand a like distance for the same decrease in atmospheric pressure since the capsules are preferably selected which will produce equal increments of expansion or contraction for equal increments of increase or decrease of pressure. While capsule 115 is expanding in a direction of arrow 200 due to decrease in ambient atmospheric pressure, capsule 145 is expanding in the direction of arrow 201 a corresponding distance. This will cause table 158 to press against shoulder 157 of lever screw 155, and cause rocker shaft 152 to rotate and move lever arm 161 to move bimetallic arm 163 a corresponding distance toward capsule 115. The effective lever length of lever screw 155 may be conveniently adjusted to bring about the necessary movement of the corresponding distance. As a result, the rotation of rocker shaft 168 is correspondingly effected and the pointer on the dial does not register the expansion of capsule 115 due to change in ambient atmospheric pressure, but measures only the expansion due to and commensurate with the manifold pressure in the interior of the manifold diaphragm capsule 115. It will be understood that compensation for change in temperature is provided by utilizing the bimetallic arm 163. Its use for temperature correction or compensation is already known in the aircraft instrument art and per se is not a novel feature.

As distinguished from the modification diagrammatically shown in Fig. 7, the diagrammatic showing of Fig. 6 corresponds generally to the embodiment of Figs. 1 to 5. In this instance manifold pressure diaphragm capsule 15 and compensating diaphragm capsule 45 are mounted to expand in the same direction. Hence, if capsule 15 expands due to a decrease in ambient atmospheric pressure, it will move the bracket 46 in the direction of arrow 210. Also, capsule 45 will expand an equal amount in the same direction. However, since the lever screw 55 is mounted on the opposite side of rocker shaft 52 from the lever arm 61 and the effective lever length of screw 55 is so adjusted, arm 63 is moved in a direction toward the fixed frame 13 a distance which corresponds to the expansion of capsule 15 due solely to decrease in ambient atmospheric pressure and accordingly rocker shaft 68 will transmit rotation to the hand on the dial only so much as represents expansion of capsule 15 due to manifold pressure in the interior of capsule 15. Consequently, the reading of the hand on the dial scale will represent true and accurate manifold pressure since there is compensation for changes in both temperature and barometric pressure conditions. It will be understood by those skilled in the art that bimetallic lever arm 63 may be adjusted for temperature compensation.

Figure 8:
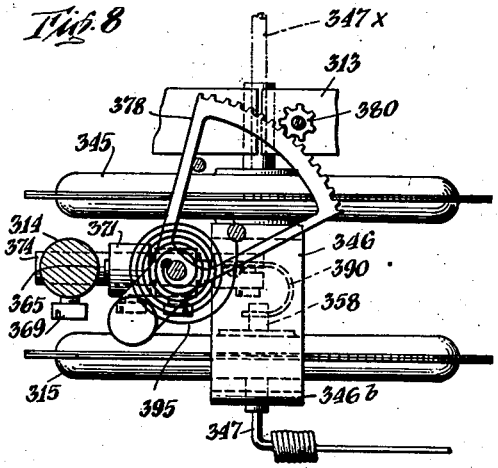
Figs. 8 and 9 are views partially diagrammatic to illustrate another modification.
Figure 9:
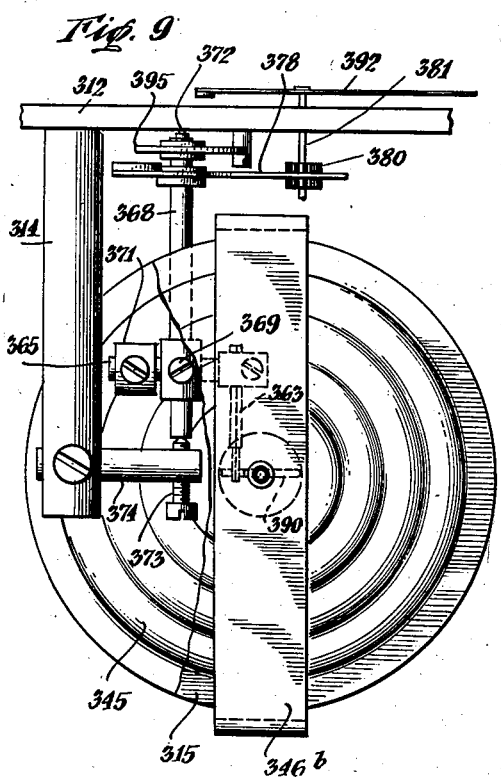

The diaphragm capsule connected to the source of pressure in the embodiments as illustrated in Figs. 1 to 7, inclusive, is shown as fixedly mounted on the frame 10 in such manner that it cannot move bodily although it is free to expand. However, if desired, the manifold pressure diaphragm capsule may be mounted to move bodily while the compensating diaphragm capsule may be fixed to the frame. In this instance a flexible conduit is provided for connecting the source of pressure to the inside of the manifold pressure capsule. Such an arrangement is illustrated in more or less diagrammatic fashion in Figs. 8 and 9. The compensating diaphragm capsule 345 is fixedly mounted on the frame 313. It is free to expand or contract due to decrease or increase in ambient atmospheric pressure but cannot move bodily. In most instances, the compensating capsule will be evacuated and sealed, although in certain embodiments it may be connected to another source of pressure as described hereinafter.

A rectangular bracket 346 (corresponding generally to bracket 146, Fig. 7) is mounted on the diaphragm capsule 345 to move bodily in response to expansion or contraction of the capsule 345 due to changes in ambient atmosphere pressure. Mounted on member 346b of bracket 346, and to be carried bodily therewith, is a manifold pressure diaphragm capsule 315 which is free to expand and contract in response to changes in atmospheric pressure but also in response to changes in the pressure to be measured. In this instance the interior of capsule 315 is connected to the source of pressure by means of a flexible conduit 347. It should be observed also that by selecting capsules 345 and 315 having the same expansion characteristics, more particularly, equal increments of expansion or contraction for equal increments of change in pressure, a simple arrangement of mechanism may be provided to transmit to the indicator the movement of the pressure capsule due to the pressure being measured.

A U-shaped member 390 has one end fixed to a stud 358. The other end engages one end of a bimetallic arm 363 which in turn has its opposite end adjustably secured at approximately right angles to a rocker arm 365. Rocker arm 365 extends through a hole in rocker shaft 368 and is adjustably secured thereto as by a screw 369. This rocker arm or lever 365 may also be provided with a counter-weight 371.

Rocker shaft 368 is pivotally mounted for rotation about its axis. One end 372 being mounted in a bearing in the face plate 312, the other end on a pivot screw 373 which in turn is mounted in a threaded opening in supporting arm 374 which is secured to a frame post 314. Rocker shaft 368 is provided with a hair spring 395 and has mounted thereon in conventional fashion a segment gear 378 meshing with a pinion 380 fixed to hand shaft 381, the outer end of which mounts a hand pointer 392 adapted to move over a scale as described hereinbefore.

In the operation of this embodiment, it will be observed that there will be no rotation of rocker shaft 368 except upon expansion or constraction of diaphragm capsule 315 due to change in the pressure being measured since any expansion or contraction of this capsule 315 due to changes in ambient atmospheric pressure is counteracted by a corresponding expansion or contraction of capsule 345 due to the ambient atmospheric pressure change. In this instance also errors which might otherwise be caused due to temperature change is corrected by reason of the provision of bimetallic arm 363.

In addition to providing a gauge for measurement and indication of absolute pressure, the invention also is adapted to provide a gauge for measurement and indication of differential pressure. If desired, the interior of compsensating capsule 345 may be connected by a conduit to one source of pressure, as for example, by a conduit shown in dot-dash lines 347x while the conduit 347 is connected to the other source, thus to provide for measurement of the differential between the two sources. At the same time, the two capsules when arranged according to the invention, will provide compensation of changes in ambient pressure.

Figure 10:
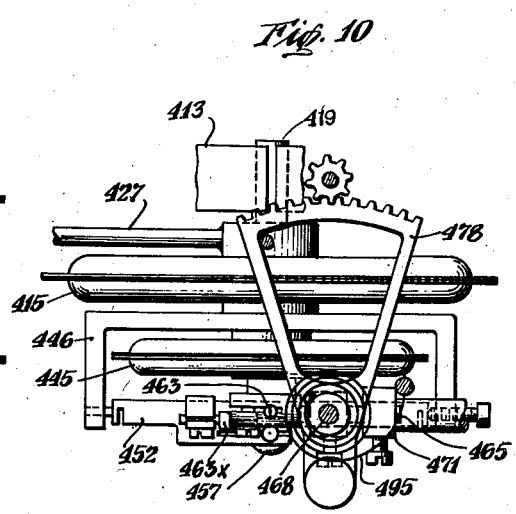
Figs. 10 and 11 are views partially diagrammatic to illustrate still another modification.
Figure 11:
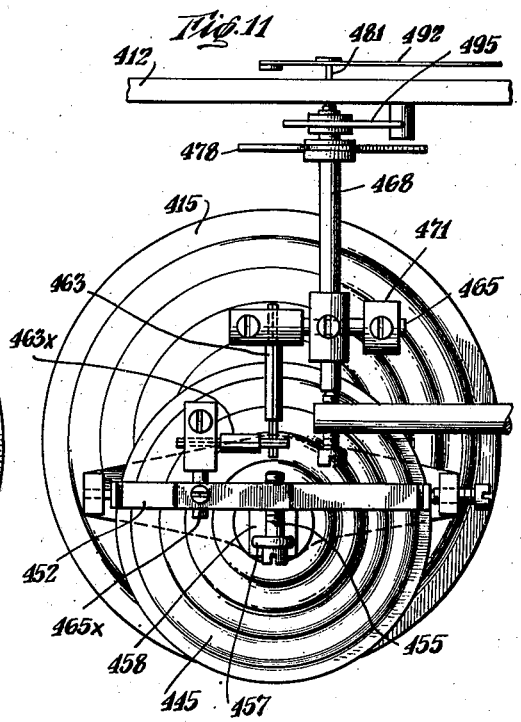

In some instances it may be desirable to utilize diaphragm capsules of different sizes or different expansion characteristics, but in any event each capsule should be such that as to it, it will expand or contract equal increments for equal increments of change of pressure. An embodiment illustrating such an instrument is shown more or less diagrammatically in Figs. 10 and 11.

In this embodiment, the manifold pressure diaphragm capsule 415 is secured to the frame 413 by means of stud 419. A conduit 427 is provided to connect the interior of capsule 415 with the source of pressure to be measured. A bracket 446 mounted on capsule 415 carries a compensating diaphragm capsule 445 which is smaller than capsule 415. Rocker shaft 452 is pivotally mounted in the bracket 446 to rotate on its longitudinal axis as hereinbefore described. A lever arm 455 is adjustably mounted on rocker shaft 452 and has an annular shoulder 457 engaging a table 458 secured to the compensating capsule 445. Also mounted on the rocker shaft 452 is a lever arm 465x and extending in a direction generally parallel to lever arm 455. Clamped to this lever arm 465x is a bimetallic arm 463x which extends at right angles to the lever arm 465x. Hence, a rotation of rocker shaft 452 on its axis caused by expansion or contraction of capsule 445 due to change in ambient pressure will effect a movement of the bimetallic arm 463x, corresponding to the angular displacement of the lever arm 465x and rocker shaft 452. Inasmuch as arm 463x is a bimetallic member, the effective lever length of arm 465x will be dependent upon the change of flexing of arm 463x due to temperature changes. Hence, there is provision for temperature correction of capsule 445.

The bimetallic arm 463x engages the end of a second bimetallic arm 463, the other end of which is clamped to one end of a rocker lever arm 465 which extends through an aperture in rocker shaft 468 and adjustably secured thereto. The opposite end of lever arm 465 is provided with a counter-balance 471. Inasmuch as arm 463 is a bimetallic member, it provides for an effective lever length of rocker arm lever 465 dependent upon and compensating for movement of capsule 415 due to temperature changes. Rocker shaft 468 is mounted on the frame in conventional manner and is provided with the usual segment gear 478 meshing with a pinion on the hand shaft 481 which is also provided with a hair spring 495. Hand shaft 481 mounts a hand pointer 492 movable over a scale on the face plate 412 as hereinbefore described. Thus there is provided an instrument of the same general nature as that described in connection with Figs. 1 to 5, inclusive, except that capsules of different sizes and expansion characteristics may be utilized. Nevertheless, the novel arrangement provides for compensation for temperature as well as ambient pressure changes, while at the same time accomplishing the desirable objective of providing an instrument which indicates only the pressure which is desired to be measured since errors which otherwise might be indicated are effectively cancelled out or eliminated.

From the foregoing it will be apparent that the invention provides a pressure gauge wherein the vapors and condensate from the manifold are confined to the manifold pressure diaphragm capsule itself and they cannot contaminate or "gum up" the gears, bearings and delicate working parts. Errors which otherwise would be caused in the indication by reason of varying atmospheric or barometric pressure are balanced out so that the indicator indicates manifold pressure only to an extent which is commensurate with the movement of the manifold pressure diaphragm due to manifold pressure.

Two units may be provided in a relatively small housing and the same instrument may be used to register two separate manifold pressures independently. If desired, more than two units may be mounted in a single housing, each to indicate a different pressure to be measured. This multiple unit feature is of particular advantage when space on the panel board of aircraft may often have to be conserved to make room for other necessary instruments. It will be apparent also that the diaphragm capsules are free to expand without restraint or the necessity of "bucking" one another to provide compensation for changes in atmospheric conditions. It will be understood, of course, that "free to expand without restraint" when used herein means without restraint but for the very slight resistance due to friction of the working parts or the small hair springs which prevent back lash. It will also be observed that there are no large vacuum chambers required nor are there any working parts which need be mounted in sealed chambers. In other words, all working parts are protected from contamination vapors yet are readily accessible for adjustment or repair. Furthermore, it is not necessary to seal the housing as the instrument is compensating regardless of static pressure outside the cockpit. Nevertheless, the housing may, if desired, be made airtight and connected to the static pressure, if desired.

While the instrument disclosed herein for illustrative purposes has been referred to as a manifold pressure gauge, it will be apparent that the invention lends itself to the production of gauges for other uses, such, for example, as fuel line pressures and other uses which the foregoing disclosure will readily suggest to those skilled in the art.

While certain novel features of the invention have been disclosed herein, and are pointed out in the annexed claims, it will be understood that various omissions, substitutions and changes may be made by those skilled in the art without departing from the spirit of the invention.

What is claimed is:

1. A gauge which comprises a frame, a first diaphragm capsule mounted on said frame, which capsule will expand upon decrease in ambient atmospheric pressure and upon increase of pressure in the interior thereof, a conduit for connecting the interior of said first diaphragm capsule with a source of pressure to be measured, a second diaphragm capsule mounted to move bodily in response to expansion of said first capsule, which second capsule will also expand upon decrease in ambient atmospheric pressure, means operative in response to expansion of said second capsule to balance out so much of the expansion of said first capsule which results from a decrease in ambient atmospheric pressure and operative in response to expansion of said first capsule when the pressure in the interior thereof is increased, and mechanism to indicate the expansion of said first capsule.

2. In a pressure gauge, an indicator to indicate the pressure to be measured, mechanism to operate said indicator in response to the pressure to be measured, a first diaphragm capsule the interior of which is connectable to communicate with the source of pressure to be measured, said first capsule being expansible in response to an increase of pressure from said source and expansible in response to a decrease in ambient atmospheric pressure, a second diaphragm capsule mounted to move bodily in response to a movement of said first capsule and expansible in response to a decrease in ambient atmospheric pressure, and means operative in response to movement of said capsules to cause said mechanism to operate said indicator only to an extent which is commensurate with the movement of said first capsule in response to pressure from said source.

3. In a pressure gauge, an indicator to indicate the pressure to be measured, mechanism to operate said indicator in response to said pressure to be measured, which mechanism includes temperature compensating means, a first diaphragm capsule the interior of which is connectable to communicate with the source of pressure to be measured, said first capsule being expansible in response to an increase of pressure from said source and expansible in response to a decrease in ambient atmospheric pressure, a second diaphragm capsule mounted to move bodily in response to a movement of said first capsule and expansible in response to a decrease in ambient atmospheric pressure, and means operative in response to movement of said capsules to cause said mechanism to operate said indicator only so much as is due to the movement of said first capsule in response to pressure from said source.

4. A manifold pressure gauge which comprises a housing, a frame within said housing, a dial on said frame carrying a scale, a hand to indicate on said scale the pressure to be measured, mechanism to operate said hand in response to the pressure to be measured, which mechanism includes temperature compensating means, a first diaphragm capsule mounted on said frame, the interior of which capsule is connectable to communicate with the source of pressure to be measured, said first capsule being expansible in response to an increase of pressure from said source and expansible in response to a decrease in ambient atmospheric pressure, a member carried by and bodily movable with said first capsule for mounting a rocker shaft, a rocker shaft mounted thereon, a second and hermetically sealed diaphragm capsule mounted on said member to move bodily in response to a movement of said first capsule and expansible in response to a decrease in ambient atmospheric pressure, means operative in response to the bodily movement of said member, means operative to rotate said rocker shaft in response to expansion of said second capsule, said respective means being arranged so that rotation of said rocker shaft will counteract the bodily movement of said member due to a change in ambient atmospheric pressure to cause said mechanism to operate said hand only to an extent commensurate with the movement of said first capsule in response to pressure from said source.

5. A pressure actuated unit for a dual unit pressure gauge which gauge includes a housing, and a frame in said housing mounting a dial having a scale graduated in pressure measuring units, said pressure actuated unit comprising an indicator to indicate the pressure to be measured, mechanism to operate said indicator in response to the pressure to be measured, a first diaphragm capsule mounted on said frame which capsule will expand upon decrease in ambient atmospheric pressure and upon increase of pressure in the interior thereof, a conduit for connecting the interior of said first diaphragm capsule with a source of pressure to be measured, a second diaphragm capsule mounted to move bodily in response to expansion of said first capsule which second capsule will also expand upon decrease in ambient atmospheric pressure, means operative in response to movement of said capsules to cause said mechanism to operate said indicator only to an extent commensurate with the movement of said first capsule in response to pressure from said source.

6. In a pressure gauge, a member having a scale, a hand movable over said scale to indicate the pressure to be measured, mechanism to operate said hand in response to the pressure to be measured, a first diaphragm capsule, a conduit connected to said first capsule and adapted to provide communication between the interior of said capsule and the source of pressure to be measured, said first capsule being expansible in response to an increase in pressure from said source and expansible in response to a decrease in ambient atmospheric pressure, a second diaphragm capsule, means mounting said second capsule to move said second capsule bodily in response to a movement of said first capsule, said second capsule being expansible in response to a decrease in ambient atmospheric pressure, means including a member mounted for bodily movement in response to an expansion of said first capsule, a rocker shaft mounted for rotation on said member, and means on said rocker shaft operative in response to bodily movement of said member to operate said mechanism and means on said rocker shaft to rotate said rocker shaft in response to expansion of said second capsule to operate said mechanism said respective means being arranged so that the response of one capsule due to change in the ambient pressure counteracts the response of the other capsule due to the same change in the ambient pressure.

7. In a pressure gauge, a member having a scale, a hand movable over said scale to indicate the pressure to be measured, mechanism to operate said hand in response to the pressure to be measured which mechanism includes temperature compensating means, a first diaphragm capsule, a damper tube connected to said first capsule and adapted to provide communication between the interior of said capsule and the source of pressure to be measured, said first capsule being expansible in response to an increase in pressure from said source and contractible in response to a decrease in pressure from said source and expansible in response to a decrease in ambient atmospheric pressure and contractible in response to an increase in said atmospheric pressure, a second diaphragm capsule, means mounting said second capsule to move said second capsule bodily in response to a movement of said first capsule, said second capsule being expansible in response to a decrease in ambient atmospheric pressure and contractible in response to an increase in said atmospheric pressure, means including a member mounted for movement in response to an expansion or contraction of said first capsule which member mounts a rocker shaft, and means on said rocker shaft operative in response to movement of either or both of said capsules to cause said mechanism to move said hand only to an extent which is commensurate with the movement of said first capsule in response to pressure from said source regardless of changes in the ambient atmospheric pressure.

8. A manifold pressure gauge which comprises a housing, a frame, having a supporting standard, mounted in said housing, a manifold pressure diaphragm capsule fixedly mounted on said frame and free to expand in a direction away from said standard on an increase in pressure within said capsule or a decrease in ambient atmospheric pressure outside said capsule, a conduit communicating with the interior of said capsule, a relatively long tube communicating with said conduit and adapted to communicate with the source of pressure to be measured, said tube being wound whereby to occupy a relatively small space within said housing, a bracket on said capsule and mounted to move bodily in response to expansion of said capsule, an hermetically sealed compensating diaphragm capsule mounted on said bracket to move bodily therewith and free to expand in response to a decrease in ambient atmospheric pressure on the outside of said compensating capsule, a rocker shaft mounted for rotation on said bracket in response to an expansion of said compensating capsule due to a decrease in ambient atmospheric pressure, a second rocker shaft mounted on said frame for rotation, a lever mounted on said first mentioned rocker shaft operative to rotate said second rocker shaft in response to expansion of said manifold pressure capsule due to manifold pressure and a second lever on said first mentioned rocker shaft operative in response to expansion of said compensating capsule to rotate said second rocker shaft in a direction opposite to the direction of rotation of said second rocker shaft as a result of expansion of said manifold pressure capsule due to a decrease in ambient atmospheric pressure and mechanism operative in response to rotation of said second rocker shaft to indicate manifold pressure.

9. A manifold pressure gauge which comprises a housing, a frame having a supporting standard, mounted in said housing, a manifold pressure diaphragm capsule fixedly mounted on said frame and free to expand in a direction away from said standard on an increase in pressure within said capsule or a decrease in ambient atmospheric pressure outside said capsule, a conduit communicating with the interior of said capsule, a tube communicating with said conduit and adapted to communicate with the source of pressure to be measured, a bracket on said capsule and mounted to move bodily in response to expansion of said capsule, a compensating diaphragm capsule mounted on said bracket to move bodily therewith and free to expand in response to a decrease in ambient atmospheric pressure, a rocker shaft mounted for rotation on said bracket in response to an expansion of said compensating capsule due to a decrease in ambient atmospheric pressure, a second rocker shaft mounted on said frame for rotation, a first lever mounted on said first mentioned rocker shaft operative to rotate said second rocker shaft in response to expansion of said manifold pressure capsule due to manifold pressure and a second lever on said first mentioned rocker shaft operative in response to expansion of said compensating capsule to rotate said first rocker shaft to cause said first lever to rotate said second rocker shaft in a direction opposite to the direction of rotation of said second rocker shaft caused by expansion of said manifold pressure capsule due to a decrease in ambient atmospheric pressure and mechanism operative in response to rotation of said second rocker shaft to indicate manifold pressure.

10. A manifold pressure gauge which comprises a housing, a frame having a supporting standard, mounted in said housing, a manifold pressure diaphragm capsule fixedly mounted on said frame and free to expand in a direction away from said standard on an increase in pressure within said capsule or a decrease in ambient atmospheric pressure outside said capsule, a conduit communicating with the interior of said capsule, a tube communicating with said conduit and adapted to communicate with the source of pressure to be measured, a bracket on said capsule and mounted to move bodily in response to expansion of said capsule, an hermetically sealed compensating diaphragm capsule mounted on said bracket to move bodily therewith and free to expand in response to a decrease in ambient atmospheric pressure, a first rocker shaft mounted for rotation on said bracket in response to an expansion of said compensating capsule due to a decrease in ambient atmospheric pressure, a second rocker shaft mounted on said frame for rotation, a first lever mounted on said first rocker shaft operative to rotate said second rocker shaft in response to expansion of said manifold pressure capsule due to manifold pressure and a second lever on said first mentioned rocker shaft operative in response to expansion of said compensating capsule to rotate said first rocker shaft to cause said first lever to rotate said second rocker shaft in a direction opposite to the direction of rotation of said second rocker shaft caused by expansion of said manifold pressure capsule due to a decrease in ambient atmospheric pressure whereby to balance out the movement of said capsules due to a change in ambient atmospheric pressure and mechanism operative in response to the resultant rotation of said second rocker shaft to indicate manifold pressure.

11. In a pressure gauge, a member having a scale, a hand movable over said scale to indicate the pressure to be measured, mechanism to operate said hand in response to the pressure to be measured, a first diaphragm capsule, a conduit connected to said first capsule and adapted to provide communication between the interior of said capsule and the source of pressure to be measured, said first capsule being expansible in response to an increase in pressure from said source and expansible in response to a decrease in ambient atmospheric pressure, a second diaphragm capsule, means mounting said second capsule to move said second capsule bodily in response to a movement of said first capsule, said second capsule being expansible in response to a decrease in ambient atmospheric pressure, means including a member mounted for bodily movement in response to an expansion of said first capsule, a rocker shaft mounted for rotation on said member, and means on said rocker shaft operative in response to bodily movement of said member to operate said mechanism and means on said rocker shaft to rotate said rocker shaft in response to expansion of said second capsule to operate said mechanism, said capsules, rocker shaft and the respective mounting means being so arranged that response of said first capsule due to change in ambient atmospheric pressure is counteracted by the response of said second capsule due to the same change in ambient atmospheric pressure, and means to provide temperature compensation for said second diaphragm capsule.

12. In a pressure gauge, indicating means, mechanism to operate said indicating means in response to the pressure to be measured, a first diaphragm capsule which expands or contracts in response to a change in ambient pressure, means mounting said first capsule permitting said capsule so to expand and contract, a second diaphragm capsule adapted to expand or contract in response to a change in ambient pressure, means for mounting said second capsule for bodily movement of said second capsule in response to expansion or contraction of said first capsule, a conduit adapted to connect the interior of one of said capsules with a source of pressure, and means operative in response to movements of said capsules to operate said mechanism operating said indicating means and so arranged that the response of one capsule due to changes in ambient pressure is counteracted by the response of the other capsule due to changes in the ambient pressure.

13. In a gauge for indicating pressure, a frame, a first diaphragm capsule mounted on said frame adapted to expand and contract in response to a change in ambient atmospheric pressure, a second diaphragm capsule adapted to expand and contract in response to a change in ambient atmospheric pressure, means mounting said second capsule for bodily movement of said second capsule in response to expansion or contraction of said first capsule, a conduit extending into the interior of one of said capsules and adapted for connection to a source of pressure, an indicator and mechanism operative in response to the movement of at least one of said capsules to transmit to said indicator the movement of said capsules which is due to the pressure from said source, said capsules and mechanism being so arranged that expansion or contraction of one of said capsules due to changes in ambient atmospheric pressure counteracts expansion or contraction of the other of said capsules due to the same changes in ambient atmospheric pressure whereby the movement of either of said capsules due to changes in ambient pressure is not transmitted to said indicator.

14. In a pressure gauge, means for indicating pressure, a frame, a first hermetically sealed diaphragm capsule mounted on said frame and free to expand and contract on decrease or increase of ambient pressure, a second diaphragm capsule, means mounting said second capsule for bodily movement in response to expansion or contraction of said first capsule, a conduit connecting with the interior of said second capsule and adapted to be connected with a source of pressure, said second capsule being free to expand or contract on decrease or increase of ambient pressure, mechanism operative in response to expansion or contraction of said second capsule due to pressure from said source in the interior of said second capsule to transmit to said indicating means only the movement of said second capsule which is due to the pressure from said source, said mechanism being so arranged that movement of one of said capsules due to changes in ambient pressure is counteracted by the movement of the other of said capsules due to the same changes in ambient pressure.

15. In a pressure gauge, means for indicating pressure to be measured, a frame, a first capsule mounted on said frame and having a conduit connecting with the interior thereof and adapted to be connected to one source of pressure, said first capsule being free to expand and contract on a decrease or increase of ambient pressure, or on increase or decrease of pressure in the interior thereof from said first source, a diaphragm mounting means mounted on said first capsule, for bodily movement in response to movement of the diaphragm of said first capsule, a second diaphragm capsule mounted on said mounting means and movable bodily therewith, said second capsule having a conduit connecting with the interior thereof and adapted to be connected to a second source of pressure, said second capsule being free to expand or contract on a decrease or increase of ambient pressure or on increase or decrease of pressure in the interior thereof from said second source, mechanism operative in response to the movement of at least one of said capsules to transmit to said indicating means the movement of said capsules due to the differential pressure between said first and second sources, said capsules and mechanism being arranged in such fashion that movement of the diaphragm of said capsules due to changes in ambient pressure is not transmitted to said indicating means.

16. In a pressure gauge, indicating means, a frame, a first diaphragm capsule mounted on said frame, a conduit connected to said first capsule and adapted to provide communication between the interior of said capsule and the source of pressure to be measured, said first capsule being expansible in response to an increase in pressure from said source and expansible in response to a decrease in ambient atmospheric pressure, a second diaphragm capsule, means mounting said second capsule for bodily movement in response to an expansion or contraction of said first capsule, said second capsule being expansible in response to a decrease in ambient atmospheric pressure, means including a rocker shaft mounted on said second capsule mounting means and movable bodily therewith, means operative in response to expansion of said second capsule to rock said shaft, and mechanism including temperature compensation means for each of said first and second capsules to transmit the movement of said first capsule due to pressure from said source to said indicating means, said capsules, mechanism and rocker shaft being operatively arranged to prevent movement of said capsules due to changes in ambient pressure from being transmitted to said indicating means.

WALTER ANGST.